United States Patent [19]

Holtrop

[11] 4,441,674
[45] Apr. 10, 1984

[54] CONSTRAINED STORE EJECTOR

[75] Inventor: John W. Holtrop, Ridgecrest, Calif.

[73] Assignee: The United States of America as represented by the Secretary of the Navy, Washington, D.C.

[21] Appl. No.: 231,718

[22] Filed: Feb. 5, 1981

[51] Int. Cl.³ .......................... B64D 1/02; B64D 1/12
[52] U.S. Cl. ............................. 244/137 R; 89/1.5 B; 89/1.5 H; 294/83 AB
[58] Field of Search ................. 244/137 R; 89/1.5 R, 89/1.5 B, 1.5 C, 1.5 F, 1.5 G, 1.5 H; 294/83 AE, 83 AA, 83 AB

[56] References Cited

U.S. PATENT DOCUMENTS

| | | | |
|---|---|---|---|
| 3,059,956 | 10/1962 | Geffner | 294/83 |
| 3,610,094 | 10/1971 | Craigie | 89/1.5 F |
| 3,854,680 | 12/1974 | Hasquenoph et al. | 244/137 R |
| 3,871,604 | 3/1975 | Coutin | 244/137 R |
| 3,883,097 | 5/1975 | Billot | 244/137 R |
| 3,974,990 | 8/1976 | Holt et al. | 244/137 R |
| 4,088,287 | 5/1978 | Hasquenoph | 244/137 R |
| 4,168,046 | 9/1979 | Hasquenoph et al. | 89/1.5 B |
| 4,257,639 | 3/1981 | Stock | 244/137 R |

Primary Examiner—Charles E. Frankfort
Attorney, Agent, or Firm—R. F. Beers; W. Thom Skeer; Kenneth G. Pritchard

[57] ABSTRACT

An apparatus for the carriage and release of aircraft stores uses two ejector pistons with integral latch hooks. The pistons are hydraulically interconnected to release a store by simultaneous extension. The latch hooks are opened by upward compression of a spring within the ejector piston. A pair of hydraulically actuated sway braces are mounted on each piston assembly.

5 Claims, 13 Drawing Figures

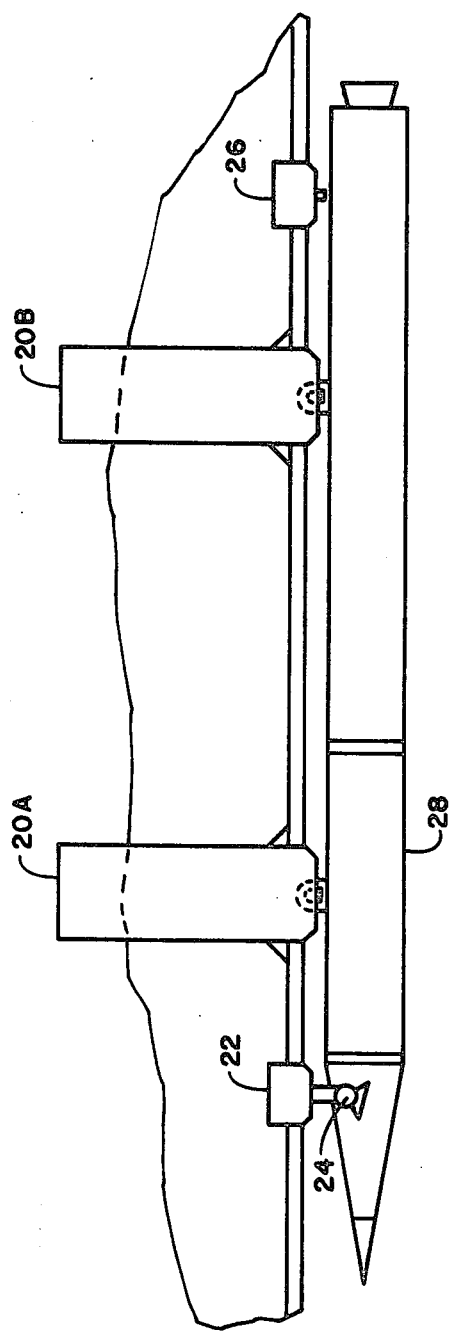
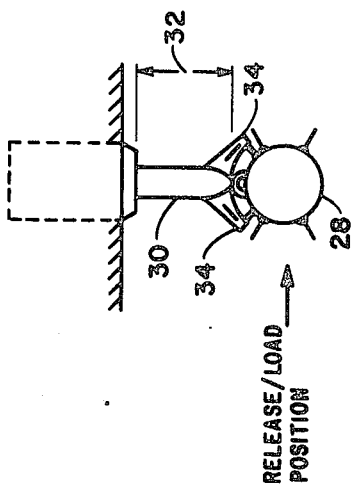
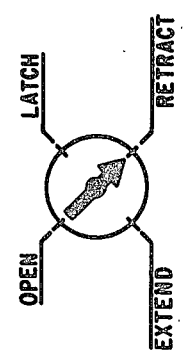
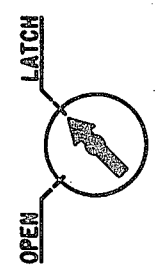

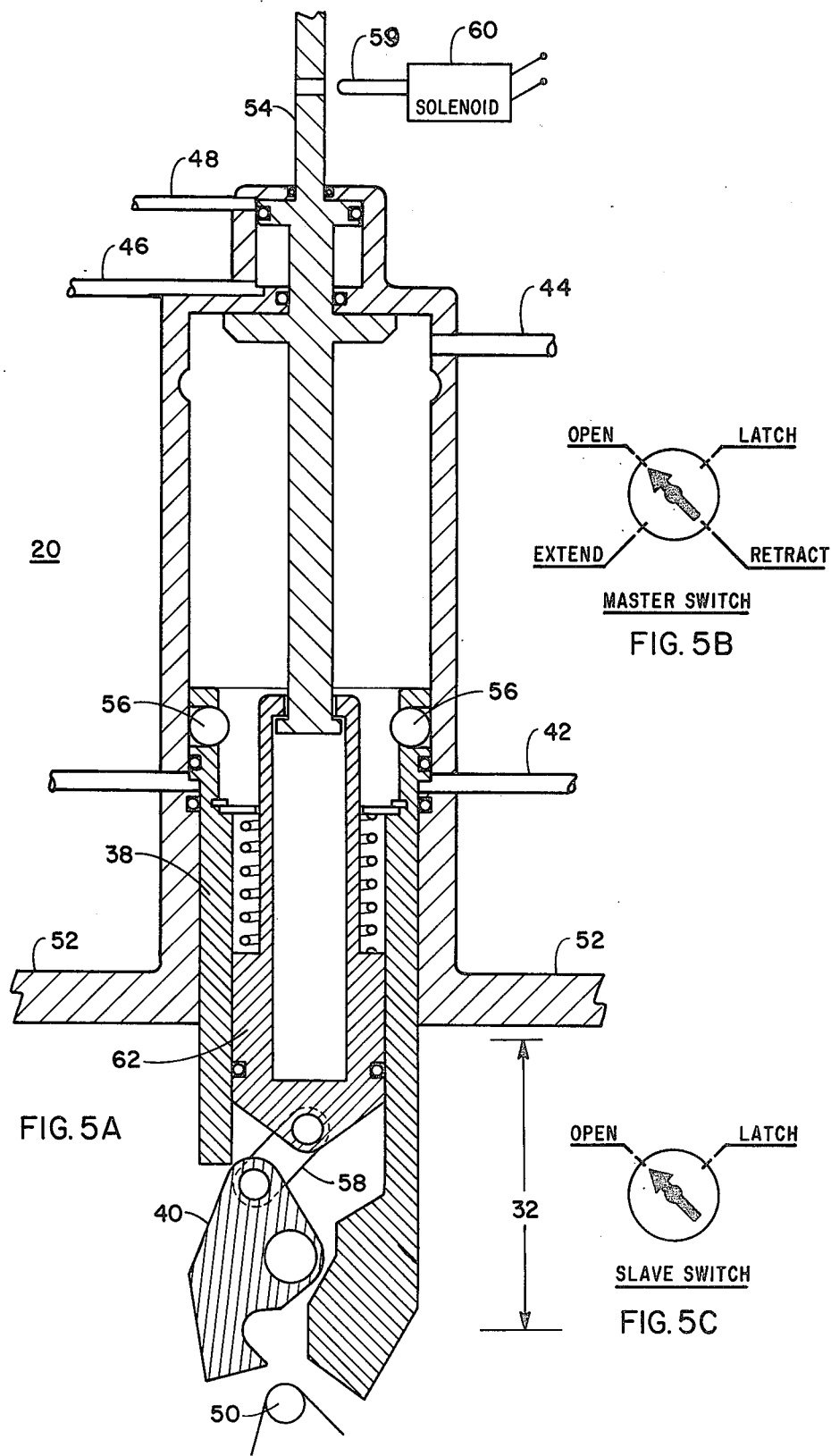

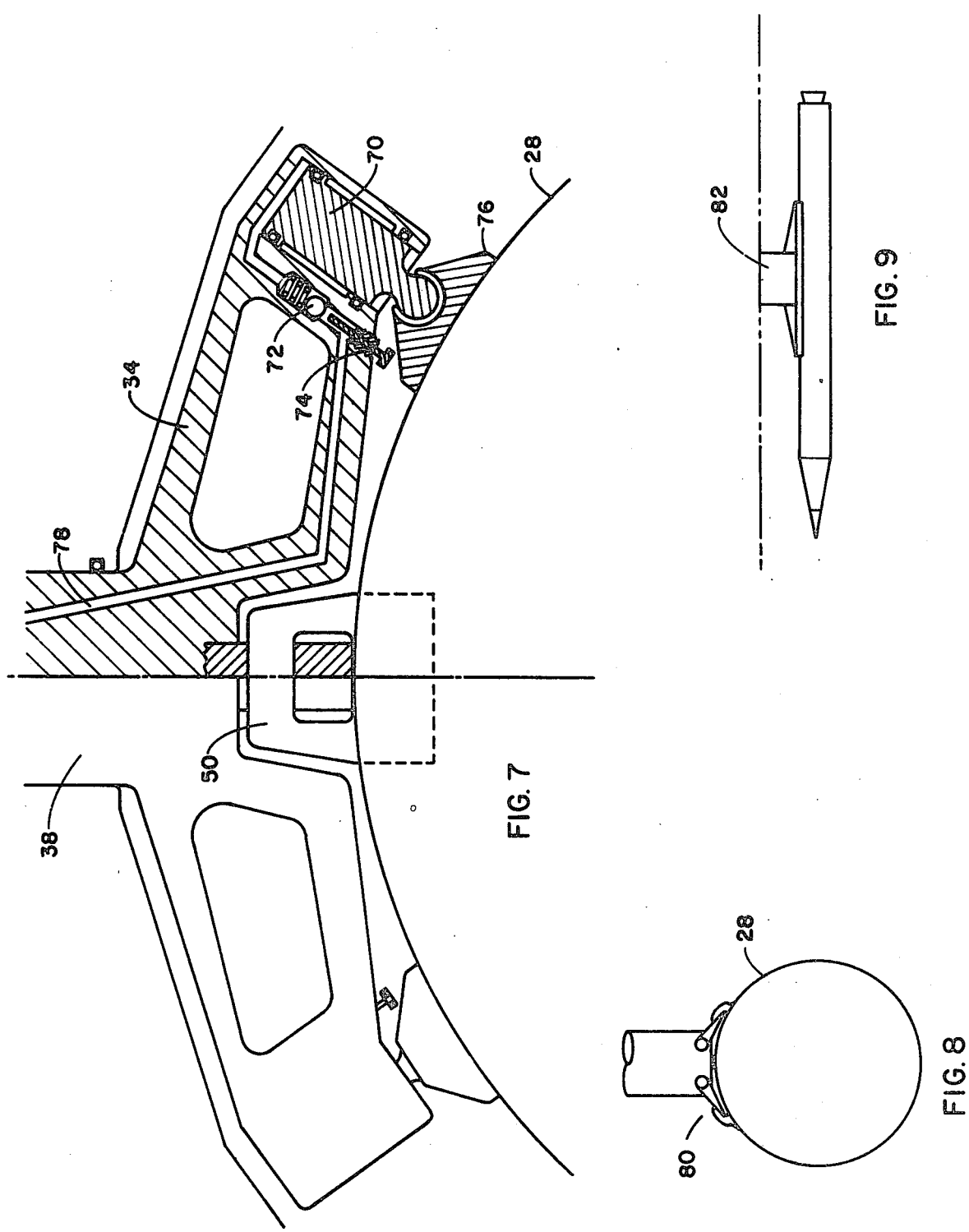

CONSTRAINED STORE EJECTOR

BACKGROUND OF THE INVENTION

1. Field of the Invention

The present invention is concerned with aircraft-stores suspension and release equipment. More particularly, it is concerned with a mechanism that carries stores and releases them under controlled and repeatable conditions.

2. Description of the Prior Art

Engineers have long been faced with problems associated with the carriage, and, ultimately, safe separation and accurate delivery of weapons, including bombs, rockets and missiles, from underneath an aircraft. The size, shape, weight, location of the center of gravity and whether the store has fins or canards all cause variations in the loads generated and the separation characteristics, not to mention the aircraft's velocity and angle of attack.

Early suspension and release mechanisms were simple hooks on the underside of the craft, they were manually operated, and relied upon gravity to force the weapons away. As aircraft speeds increased, positive separation became necessary to prevent the store from striking the aircraft.

SUMMARY OF THE INVENTION

This device controls the launch conditions of stores from aircraft. The store is totally constrained in roll, pitch, and yaw until the moment of its release. This negates any detrimental effects caused by aerodynamic loads or G forces.

Combining the functions of the suspension, release, ejector, and sway brace mechanisms into one module results in a design which can be easily adapted to existing or future stores and airplanes. Store design is simplified since major suspension and ejection loads go through the same points. The ejector modules can be repositioned quickly since there are no mechanical connections. This allows the aircraft to be easily reconfigured to carry various size stores. Being able to load the stores with the ejector extended simplifies the loading operation. More room is available to insure latch function, and the entire store is visible and easy to reach. The retract position lends itself to a low drag, conformal carriage configuration, since the stores release mechanism withdraws into the ejector body. This improves aircraft performance, and reduces its radar cross-section.

BRIEF DESCRIPTION OF THE DRAWINGS

FIG. 1 is a cross-section of the present invention holding a store to an aircraft in the carriage/hold position;

FIG. 2 and FIG. 3 show the master and slave control positions for FIG. 1;

FIG. 4 shows an end-on view of the present invention holding a store in the release/load position;

FIGS. 5A, 5B, and 5C show a cross-section of the present invention in the release/load position;

FIG. 7 shows a partial cross-section of a hydraulic sway brace to be used with the present invention;

FIG. 8 shows an end-on view of the dove-tail carry method for the present invention; and FIG. 9 shows a side view of an extended dove-tail carry method.

DESCRIPTION OF THE PREFERRED EMBODIMENT

Figure 6A:
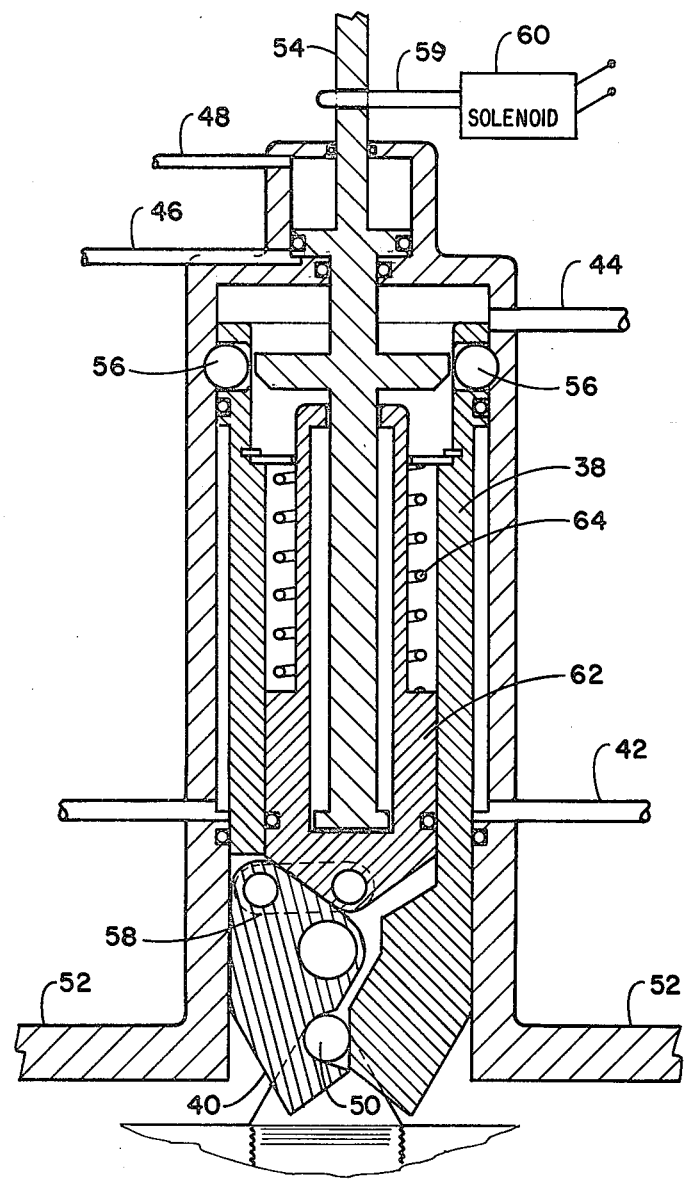
FIGS. 6A, 6B, and 6C show a cross-section of the present invention in the carriage/hold position.

FIG. 1 shows the general arrangement of the present invention. This device uses two similar ejector modules 20 to provide all suspension, eject, and release functions. These pistons are arranged in pairs at the desired store suspension location on the aircraft. The forward module is designated as the "MASTER", 20A and the rear one is the "SLAVE" 20B.

A control switch is mounted to the aircraft skin near each module. The master control switch 22 controls the master ejector and is key operated with a key 24 which interlocks to the ejector power supply. With key 24 inserted, the ejector is prevented from full power operation. An electrical lock, not shown, prevents key 24 from being withdrawn until cleared by the pilot via the aircraft stores management system. Control switch 26 controls SLAVE module 20B.

Control switch 26 has two positions, "OPEN" and "LATCH" as shown in FIG. 2. Master switch 22 is provided with "retract" and "extend" functions which power both ejectors simultaneously as shown in FIG. 3. Master switch 22 also has "open" and "latch" positions for securing and releasing the store.

Ejector piston 30 has sway braces 34 which are hydraulic and fixed to the end of ejector piston 30. They stabilize store 28 throughout the carriage and ejection cycles. FIG. 4 shows ejector piston 30 fully extended. The stroke length 32 moves the store 28 to its release/load position. This position is far enough from the plane to avoid contact between store 28 and the aircraft during in flight release.

FIG. 5A shows the lower cross section of an ejector module 20 in the release/load position. The ejector piston 38 is fully extended and the latch hook 40 is open. Ejector piston 38 is hydraulically raised or lowered by applying pressure to port 42 and port 44, shown in FIG. 6A. The suspension and release mechanism is built into ejector piston 38, and can only be opened by applying pressure at port 46, when the ejector is fully extended. Latch hook 40 is notched so it catches a bomb lug 50. FIGS. 5B and 5C show the "MASTER" and "SLAVE" positions.

Figure 6B:
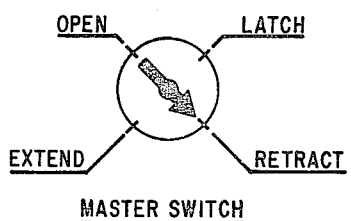
Figure 6C:
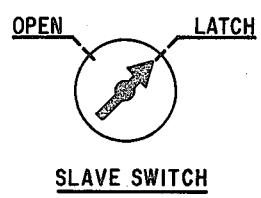

FIG. 6A shows the ejector fully retracted, in its conformal carriage configuration. Bomb lug 50 is locked by latch hook 40 which is blocked from opening by the ejector body 52. The release rod 54 is powered downward, holding the locking balls 56 into ejector body 52. A release link 58, shown in FIG. 5A, forms a toggle lock linkage with latch hook 40. A safe solenoid 60 pins release rod 54 in place. FIGS. 6B and 6C show the "MASTER" and "SLAVE" positions. In this position the module requires three separate independent events to release the store.

a. Safe solenoid 60 must be moved from blocking the motion of release rod 54. With release rod 54 blocked down, it cannot activate piston 38, even at full ejector extension. Locking balls 56 also prevent extension in the event hydraulic power is lost.

b. Hydraulic pressure must be applied via port 46. This lifts release rod 54, releasing locking balls 56 and ejector piston 38. However, hydraulic pressure at port 42 prevents ejection.

c. Pressure must be applied via port 44 and vented at port 42. This drives ejector piston 38 down. Near the end of stroke 32, release rod 54 pulls out the release piston 62 by compressing a spring 64 and store 28 is released.

FIG. 7 shows the hydraulic sway brace system which can be part of ejector piston 38. A pair of sway brace pistons 70 are hydraulically activated whenever pressure is on port 42 via passage 78. A check valve 72 with manual override 74 maintains sway bracing in the event of a hydraulic failure. Manual override 74 on check valve 72 enables the ground crew to retract sway brace pistons 70. The swivel pad 76 and stroke length are designed to insure even load distribution on stores.

A complete operating sequence follows:

(1) The MASTER 20A and SLAVE 20B switches are placed in "OPEN". Hydraulic pressure at ports 44 and 46 extend ejector piston 38, and latch hooks 40 open fully as shown in FIG. 5A.

(2) Store 28 is then aligned within latch hooks 40. As alignment is achieved, the appropriate switch is turned to "LATCH". This pressurizes port 48 allowing spring loaded releasing piston 62 to drop, jamming latch hook 40 closed. The weight of store 28 is now supported by a pair of ejector piston 38 latch hooks 40, and it is hanging clear of the aircraft for easy checkout.

(3) Master switch 20A is turned to "RETRACT". Both ejector pistons 38 receive pressure at port 42, activating sway brace pistons 70. When store 28 is rigidly sway braced, pressure builds up and the ejectors slowly retract. Store 28 is drawn up into its normal carriage position and locking balls 56 are jammed into place by release rod 54.

(4) To eject store 28, pressure is applied at ports 44 and 46 and safe solenoid 60 is withdrawn. Store 28 travels rapidly downward until being released at the end of stroke 32. Throughout the ejection cycle the store is rigidly constrained by sway braces 34. Pitch attitude is controlled by hydraulically linking ejector pistons 38.

(5) After ejection, port 42 is pressurized, retracting the ejector for minimum aerodynamic drag.

(6) To unload store 28, master switch key 24 is inserted, disabling the normal high velocity eject cycle and setting safe solenoids 60. Master switch 20A is then turned to "EXTEND" which pressurizes ports 44 and 46. Release rod 54 rises against safe solenoid 60 enough to release locking balls 56, but not enough to release store 28. Ejector pistons 38 move slowly to the "extended" position. When store 28 is adequately supported, it is unlocked by the appropriate switch being placed in "OPEN". Safe solenoid 60 retracts allowing release rod 54 to rise fully, and latch hook 40 opens.

Instead of bomb lug 50, store 28 can be carried by a dove-tail joint 80 as shown in FIG. 8. This also serves as sway bracing. The dove-tail mechanism can be lengthened to provide pitch control from a single ejector piston 82 as shown in FIG. 9. For large stores, rotation during ejection would be a problem. Tandem dove-tail carriage of large stores could still be used.

What is claimed is:

1. A suspension and release mechanism for stores on a launch vehicle, such as an aircraft, comprising: at least one ejector module fastened to said launch vehicle which comprises:
    an ejector body fastened to said launch vehicle;
    an ejector piston set within said ejector body for moving said store from a release load position to a carriage/hold position and back again by hydraulic pressure;
    a latch hook pivotally mounted to the end of said ejector piston for grasping said store;
    a release piston mounted within said ejector piston and mechanically connected to said latch hook for pivoting said latch hook between said carriage and release positions;
    a release rod mounted within said release piston for changing the position of said latch hook via said release piston; and
    a spring around said release piston for limiting release of said store to upward motion of said release rod forcing compression of said spring;
  means for connecting said ejector module to a hydraulic system, such that said ejector module functions by applied pressure to hydraulic fluid; and
  a hydraulic sway brace system attached to said ejector module for rigidly supporting said store along said launch vehicle prior to launch of said store.

2. A suspension and release mechanism for stores on a launch vehicle, such as aircraft, as described in claim 1 further comprising a safe solenoid mounted above said ejector body for pinning said release rod in the carriage/hold position, such that said solenoid must be removed before said release rod can be forced upward to eject said store.

3. A suspension and release mechanism for stores on a launch vehicle, such as aircraft, as described in either of claims 1 or 2 where the number of ejector modules is two with the forward module on said launch vehicle referred to as the "MASTER" and the rear module as the "SLAVE".

4. A suspension and release mechanism for stores on a launch vehicle, such as aircraft, as described in either claim 1 or 2 where said hydraulic sway brace comprises:
    a pair of sway brace pistons connected to said ejector piston hydraulics for rigidly supporting said store;
    a swivel pad on the end of each sway brace piston for distributing the loading force against said store by said sway brace pistons; and
    a check valve connected to said sway brace piston for maintaining sway bracing in case of hydraulic failure.

5. A suspension and release mechanism for stores on a launch vehicle, such as aircraft, as described in claim 3 where said hydraulic sway brace comprises:
    a pair of sway brace pistons connected to said ejector piston hydraulics for rigidly supporting said store;
    a swivel pad on the end of each sway brace piston for distributing the loading force against said store by said sway brace pistons; and
    a check valve connected to said sway brace piston for maintaining sway bracing in case of hydraulic failure.

* * * * *